United States Patent
Zhou et al.

(10) Patent No.: US 9,455,646 B2
(45) Date of Patent: Sep. 27, 2016

(54) FILTER DEVICE, POWER CONVERTER AND COMMON MODE NOISE SUPPRESSION METHOD

(71) Applicant: DELTA ELECTRONICS, INC., Taoyuan Hsien (TW)

(72) Inventors: Jinping Zhou, Taoyuan Hsien (TW); Min Zhou, Taoyuan Hsien (TW); Yicong Xie, Taoyuan Hsien (TW)

( * ) Notice: Subject to any disclaimer, the term of this patent is extended or adjusted under 35 U.S.C. 154(b) by 262 days.

(21) Appl. No.: 13/933,799

(22) Filed: Jul. 2, 2013

(65) Prior Publication Data
US 2014/0268933 A1    Sep. 18, 2014

(30) Foreign Application Priority Data

Mar. 18, 2013 (CN) .......................... 2013 1 0085937

(51) Int. Cl.
*H02M 1/12*  (2006.01)
*H02M 1/14*  (2006.01)
*H02M 7/797* (2006.01)

(52) U.S. Cl.
CPC ............. *H02M 7/797* (2013.01); *H02M 1/12* (2013.01); *H02M 2001/123* (2013.01)

(58) Field of Classification Search
CPC . H02M 1/12; H02M 2001/123; H02M 1/126
USPC .................................................. 363/44, 37
See application file for complete search history.

(56) References Cited

U.S. PATENT DOCUMENTS

| | | | |
|---|---|---|---|
| 8,115,444 B2* | 2/2012 | De et al. ........................ | 318/801 |
| 9,030,852 B2* | 5/2015 | Wijekoon et al. .............. | 363/37 |
| 9,099,906 B2* | 8/2015 | Tamura et al. | |
| 9,099,926 B2* | 8/2015 | Nguyen | |
| 2005/0073863 A1* | 4/2005 | de Rooij et al. ................ | 363/39 |

* cited by examiner

*Primary Examiner* — Jessica Han
*Assistant Examiner* — Lorena Bruner
(74) *Attorney, Agent, or Firm* — Yunling Ren; Eaton & Van Winkle

(57) ABSTRACT

A filter device comprises: a filter capacitor portion having one set of ends connected to the AC voltage unit, and the other set of ends connected to DC terminals of the semiconductor switching unit via a low impedance element, wherein both set of ends of the filter capacitor portion and the DC terminals of the semiconductor switching unit are static ground terminals of the power converter; a filter inductance portion a first set of connection terminals connected to the AC voltage unit, a second set of connection terminals connected to the AC terminals of the semiconductor switching unit, a third set of connection terminals connected to one of the static ground terminals of the power converter, and a fourth set of connection terminals; and a compensation portion having one end connected to the fourth set of connection terminals and the other end connected to the ground.

24 Claims, 21 Drawing Sheets

US 9,455,646 B2

FILTER DEVICE, POWER CONVERTER AND COMMON MODE NOISE SUPPRESSION METHOD

CROSS REFERENCE TO RELATED APPLICATIONS

The present application claims priority under 35 U.S.C. §119 to Chinese Patent Application No. 201310085937.9, filed on Mar. 18, 2013, the entire content of which is incorporated herein by reference.

FIELD OF THE INVENTION

The present application relates to a filter device or a power converter, particularly relates to a filter device, a power converter, a application system thereof and a common mode noise suppression method, which can suppress common mode noise.

BACKGROUND OF THE INVENTION

FIG. 1 shows a typical topological structure of a three-phase power converter comprising: a power converter unit (or referred to as a semiconductor switching unit) 12 which comprises: three bridge arms each being comprised of two groups of semiconductor switching elements connected in series respectively, midpoints A, B and C of the three bridge arms acting as AC terminals, and DC terminals O, P and Q formed by DC bus filter capacitors $C_{B0}$, $C_{B1}$ and $C_{B2}$, wherein the terminal O is a common terminal of the filter capacitors $C_{B1}$ and $C_{B2}$; a filter inductance group 14' having one set of ends connected to a grid 11 and the other set of ends connected to the midpoints A, B and C of the bridge arms of the semiconductor switching unit 12; a filter capacitor group 13 comprising three star-connected filter capacitors Cx each having one end connected to the grid 11 and the other end connected with other capacitors Cx to form a neutral point N. The filter inductance group 14' and the filter capacitor group 13 constitute a differential mode filter.

The grid 11 may be referred to as an AC voltage unit, for example, it may be an AC voltage of about 50 Hz, such as a three-phase AC power supply (for supplying power to equipments) on a grid side or a power receiving unit (for receiving electrical energy generated by a generator) on a motor side.

Moreover, the power converter may further comprise a Line Impedance Stabilization Network (LISN) 16 which is an auxiliary equipment for testing conducted electromagnetic interference.

Provided that there is a distributed (or so-called parasitic) capacitor $C_0$ between a DC bus connected to the DC bus filter capacitors $C_{B0}$, $C_{B1}$ or $C_{B2}$ and the ground, and $C_{1A}$, $C_{1B}$ and $C_{1C}$ are distributed capacitors respectively between the midpoints of each of the bridge arms of the semiconductor switching unit and the ground. Potential jumping of the midpoints of the DC bus relative to the ground, as well as potential jumping of the midpoints of the bridge arms relative to the ground, may cause displacement currents through the distributed capacitors, and the displacement currents flowing to the ground may cause common mode noise. In order to meet the international EMC standards, it is a common concern in the field to suppress common mode noise effectively with low cost.

FIG. 2 illustratively shows a conventional solution for suppressing common mode noise using an inactive common mode filter 17 to suppress common mode noise. The common mode filter 17 comprises a common mode inductance 171 and a filter capacitor group 172 formed by three star-connected filter capacitors Cy. The common mode inductances usually are big in volume and high in cost. When the common mode inductances are required to have high common mode inductance value, it is difficult to design the common mode inductances.

Another kind of conventional solution depresses the requirements on the common mode filters by reducing original common mode noise. As shown in FIG. 3, the neutral point N of the filter capacitor group 13 is connected to the midpoint O of the DC bus. Since N is a virtual neutral point whose potential is relatively stable, the potential of the bus relative to the ground is also clamped to a stable potential after the DC bus midpoint O is connected to the virtual neutral point N, thus it can reduce common mode noise to some extent. A variation of this solution is, as shown in FIG. 4, considering that in direct connection a current of zero sequence component on the connection line may be high, a capacitor may be connected into the connection line between the neutral point N of the filter capacitor and the midpoints O of the DC bus, such that the current of zero sequence component may be controlled to a proper value. However, this kind of solution can only suppress the common mode noise flowing to the ground through the distributed capacitor $C_0$ between the DC bus and the ground, and the common mode noise caused by the distributed capacitors $C_{1A}$, $C_{1B}$ and $C_{1C}$ between the midpoints of the bridge arms and the ground are not able to be suppressed, but instead, to be increased.

SUMMARY OF THE INVENTION

In order to overcome at least one of the deficiencies in the prior art, one object of the present application is to provide a filter device for filtering common mode noise in a circuit, a power converter and a common mode noise suppression method.

A further object of the present application is to achieve better filtering of common mode noise in the power converter with a filter device having compact structure and low cost.

According to one aspect of the present application, it provides a filter device connected between an AC voltage unit and a semiconductor switching unit of a power converter for filtering common mode noise in a circuit, the filter device comprising: a filter capacitor portion having one set of ends connected to the AC voltage unit, and the other set of ends connected to DC terminals of the semiconductor switching unit via a low impedance element, wherein both sets of ends of the filter capacitor portion and the DC terminals of the semiconductor switching unit are static ground terminals of the power converter; a filter inductance portion having a first set of connection terminals connected to the AC voltage unit, a second set of connection terminals connected to AC terminals of the semiconductor switching unit, a third set of connection terminals connected to one of the static ground terminals of the power converter, and a fourth set of connection terminals; and a compensation portion having one end connected to the fourth set of connection terminals and the other end connected to the ground.

According to an embodiment, the filter inductance portion comprises inductances each comprising: a primary winding whose ends correspondingly act as the first set of connection terminal and the second set of connection terminal; and an auxiliary winding coupled with the primary winding, having one end being a dotted terminal of the second set of connection terminal of the primary winding and acting as the third set of connection terminal of the filter inductance portion, and the other end as the fourth set of connection terminal of the filter inductance portion.

According to an embodiment, the semiconductor switching unit comprises at least one jumping terminal, the auxiliary winding of the filter inductance portion is coupled with the corresponding primary winding such that the auxiliary winding has a voltage in jumping direction opposite to that of at least one jumping terminal of the power converter.

According to an embodiment, the DC terminals of the semiconductor switching unit are at least one of a high potential terminal, a low potential terminal or a neutral potential terminal.

According to an embodiment, the low impedance element has an impedance value less than ½ time of that of the primary winding of the filter inductance portion.

According to an embodiment, the low impedance element is a wire or a capacitor.

According to an embodiment, the compensation portion comprises a capacitive impedance element.

According to an embodiment, the capacitive impedance element is a capacitor.

According to an embodiment, the compensation portion further comprises a resistance to be connected in series with the capacitive impedance element.

According to an embodiment, the AC voltage unit has three-phase AC voltages, and has three-phase AC terminals correspondingly connected to the first set of connection terminals of the filter inductance portion, and the AC terminals of the semiconductor switching unit consists of three AC terminals.

According to an embodiment, the filter capacitor portion consists of three capacitors each has one end connected to a corresponding one of the three-phase AC terminals, and the other end connected with the other two capacitors to form a neutral point acting as one of the static ground terminals of the power converter.

According to an embodiment, the filter inductance portion consists of a first inductance comprising a first primary winding and a first auxiliary winding, a second inductance comprising a second primary winding and a second auxiliary winding, and a third inductance comprising a third primary winding and a third auxiliary winding, each of the primary windings has a first end acting as the first set of connection terminal of the filter inductance portion and connected to a corresponding one of the three-phase AC terminals, and a second end acting as the second set of connection terminal of the filter inductance portion and connected to a corresponding one of the three AC terminals of the semiconductor switching unit, the first auxiliary winding has a first end acting as the third set of connection terminal of the filter inductance portion and connected to one of the static ground terminals of the power converter, the second auxiliary winding has a first end connected to a second end of the first auxiliary winding, the third auxiliary winding has a first end connected to a second end of the second auxiliary winding, and the third auxiliary winding has a second end acting as the fourth set of connection terminal of the filter inductance portion and connected to the compensation portion.

According to an embodiment, the filter inductance portion comprises three inductances each having a primary winding and an auxiliary winding, the primary winding has a first end acting as the first set of connection terminal of the filter inductance portion and connected to a corresponding one of the three-phase AC terminals, and a second end acting as the second set of connection terminal of the filter inductance portion and connected to a corresponding one of three AC terminals of the semiconductor switching unit, the auxiliary winding has a first end acting as the third set of connection terminal of the filter inductance portion and connected to a corresponding one of the static ground terminals of the power converter, and a second end acting as the the fourth set of connection terminal of the filter inductance portion and connected to the compensation portion.

According to an embodiment, the AC voltage unit has a single-phase AC voltage, and has two AC terminals correspondingly connected to the first set of connection terminals of the filter inductance portion, and the AC terminals of the semiconductor switching unit consists of two AC terminals.

According to an embodiment, the filter capacitor portion consists of two capacitors each has one end connected to a corresponding one of the two AC terminals, and the other end connected with the other capacitor to form the neutral point acting as one of the static ground terminals of the power converter.

According to an embodiment, the filter inductance portion consists of a first inductance comprising a first primary winding and a first auxiliary winding, a second inductance comprising a second primary winding and a second auxiliary winding, each of the primary windings has a first end acting as the first set of connection terminal of the filter inductance portion and connected to a corresponding one of the two AC terminals, and a second end acting as the second set of connection terminal of the filter inductance portion and connected to a corresponding one of the two AC terminals of the semiconductor switching unit, the first auxiliary winding has a first end acting as the third set of connection terminal of the filter inductance portion and connected to one of the static ground terminals of the power converter, the second auxiliary winding has a first end connected to a second end of the first auxiliary winding, the second auxiliary winding has a second end acting as the fourth set of connection terminal of the filter inductance portion and connected to the compensation portion.

According to an embodiment, the filter inductance portion comprises two inductance each having a primary winding and an auxiliary winding, the primary winding has a first end acting as the first set of connection terminal of the filter inductance portion and connected to a corresponding one of the two AC terminals, and a second end acting as the second set of connection terminal of the filter inductance portion and connected to a corresponding one of the two AC terminals of the semiconductor switching unit, the auxiliary winding has a first end acting as the third set of connection terminal of the filter inductance portion and connected to a corresponding one of the static ground terminals of the power converter, and a second end acting as the fourth set of connection terminal of the filter inductance portion and connected to the compensation portion.

According to an embodiment, a product of the compensation voltage of each of the auxiliary windings of the filter inductance portion and the equivalent impedance of the compensation portion equals to 0.5 to 1.5 times of a product of the equivalent common mode voltage and the equivalent common mode impedance of the semiconductor switching unit.

According to an embodiment, the semiconductor switching unit is an AC-DC semiconductor switching unit or a DC-AC semiconductor switching unit.

According to an embodiment, the semiconductor switching unit is a two-level semiconductor switching unit, a three-level semiconductor switching unit or a multi-level semiconductor switching unit.

According to another aspect of the present application, it provides a power converter comprising the filter device as above described, the power converter further comprises the semiconductor switching unit, wherein the filter device is connected between the AC voltage unit and the semiconductor switching unit.

According to an embodiment, an electromagnetic interference filter is connected between the filter device and the AC voltage unit.

According to an embodiment, the electromagnetic interference filter is a differential mode filter or a common mode filter.

According to still another aspect of the present application, it provides a common mode noise suppression method comprising: using the filter capacitor portion, the filter inductance portion and the compensation portion in the filter device as above described to filter the common mode noise in the circuits.

The present application has advantages as below over the prior art:

In the filter device of the present application, the filter capacitor portion may be exactly the filter capacitors in the typical structure of the conventional power converter, without additional capacitor elements, and the filter inductance portion may only add one auxiliary winding for each of the filter inductances respectively. Moreover, since the auxiliary winding of each filter inductance has only a compensation current, other than a power current, flowing thereon, the wires for respective auxiliary windings may be made very thin, and thus the auxiliary winding can be very cheap in cost.

Therefore, in comparison with the common mode inductance filter solutions in the prior art, the filter device of the present application has more compact structure, which is very cheap in cost, and is able to be easily implemented. With respect to the solution of only connecting the neutral point N of the filter capacitor with the midpoint O of the DC bus, the present application may filter the common mode noise very thoroughly, not only suppressing the common mode noise flowing to the ground via the distributed capacitor between the DC bus and the ground, but also suppressing the common mode currents caused by the capacitors $C_{1A}$, $C_{1B}$ and $C_{1C}$ between the midpoints of the bridge arms and the ground.

BRIEF DESCRIPTION OF THE DRAWING

The details of the configurations and the embodiments will be described below with reference to the accompanying drawings, in which like reference numbers will be used to refer to like parts.

Wherein the reference signs are listed as below:
11—AC voltage unit; 12—semiconductor switching unit;
13—filter capacitor portion (filter capacitor group); 14—filter inductance portion;
14'—filter inductance group; 15—compensation portion;
16—Line Impedance Stabilization Network; 17—inactive common mode filter;
21—inverter unit (transducer); 22—motor;
23—output filter capacitor portion; 24—output filter inductance portion;
141~143—filter inductances; A, B and C—AC terminals;
O, P and Q—DC terminals; $L_A$, $L_B$ and $L_C$—primary windings;
$L_A'$, $L_B'$ and $L_C'$—auxiliary windings; $u_{AO}$, $u_{BO}$ and $u_{CO}$—jumping voltages;
$C_1$, $C_{1A}$, $C_{1B}$ and $C_{1C}$—distributed capacitors of the jumping terminals; $u_{CM}$—common mode voltage;
$C_{CM}$—common mode capacitor; $i_{CM}$—common mode current before compensation;

$i_{CM'}$—common mode current after compensation; Ucomp—compensation voltage;
Ccomp—compensation capacitor; 151, 152 and 153—capacitive impedance.

DESCRIPTION OF THE EMBODIMENTS

A plurality of embodiments of the present application will be described in detail in conjunction with the accompanying drawings. The details of the plurality of embodiments will be illustrated together in the following depiction for clarity. However, it should be known that the embodiments described herein are not intended to limit the present application.

Figure 1:
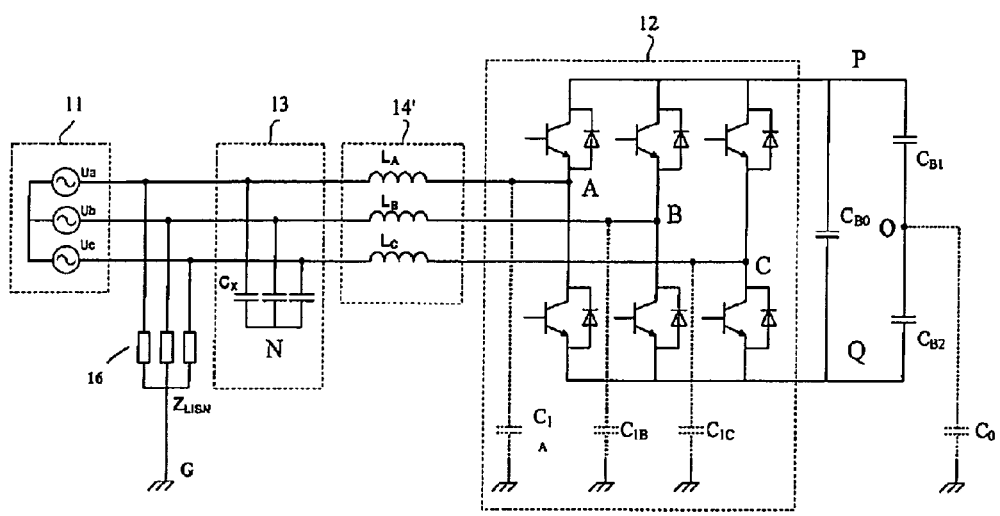
FIG. 1 is a diagram showing a typical topological structure of a three-phase power converter.
Figure 2:
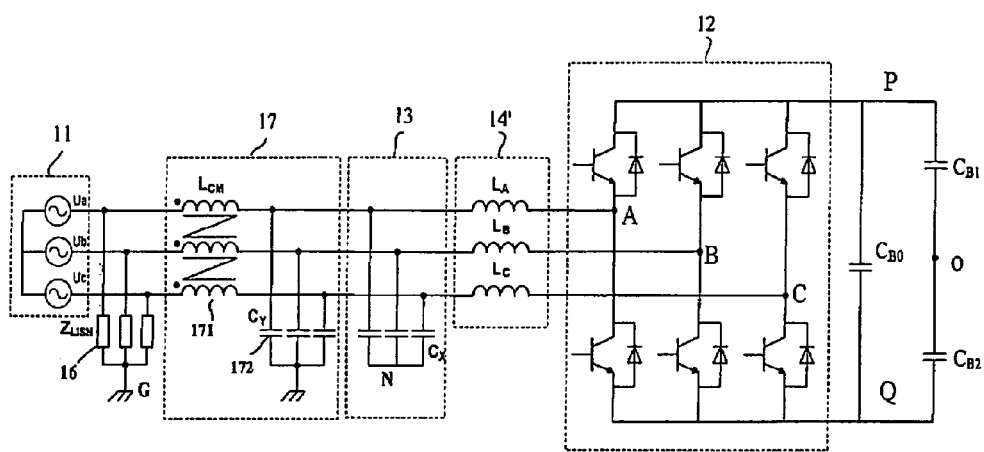
FIG. 2 is a diagram showing one common mode noise suppression solution of a conventional three-phase power converter.
Figure 3:
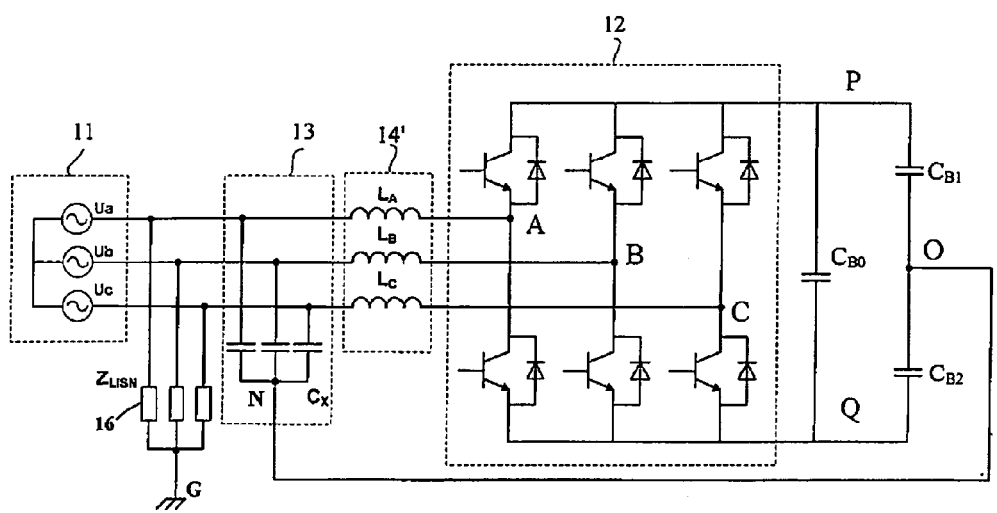
FIG. 3 is a circuit diagram illustrating a first example of another common mode noise suppression solution of the conventional three-phase power converter.
Figure 4:
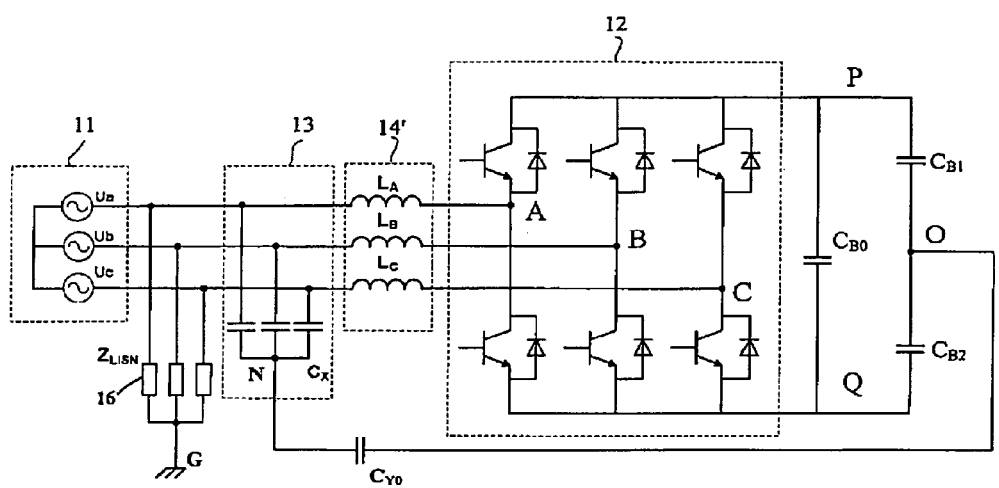
FIG. 4 is a circuit diagram illustrating a second example of another common mode noise suppression solution of the conventional three-phase power converter.
Figure 5:
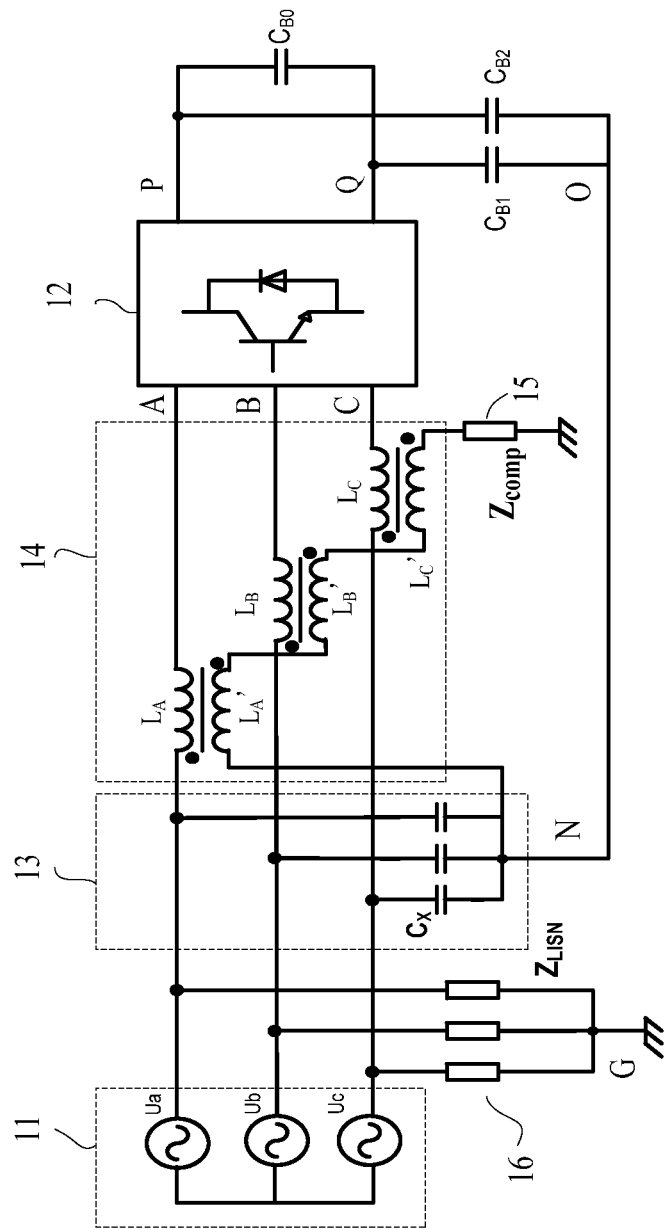
FIG. 5 is a circuit diagram illustrating a filter device according to the first embodiment of the present application.

FIG. 5 is a circuit diagram illustrating a filter device according to the first embodiment of the present application.

As shown in FIG. 5, a semiconductor switching unit 12 together with a filter device constitutes a power converter receiving an AC voltage from a AC voltage unit 11. The filter device is connected between the AC voltage unit 11 and the semiconductor switching unit 12 of the power converter and used to filter common mode noise in this circuit. The AC voltage unit 11 is of low frequency AC voltages, the frequency of which is for example about 50 Hz, or about 60 Hz. The semiconductor switching unit 12 comprises one group of AC terminals A, B and C, and one group of DC terminals O, P and Q. The voltages of the AC terminals A, B and C are high frequency modulated low frequency AC voltages. Commonly used modulating methods comprises Sinusoida Pulse Width Modulation (SPWM) and Space Vector Modulation etc. The DC terminals O, P and Q have one of a high potential, a low potential or a neutral potential. The voltages between the DC terminals O, P and Q are DC voltages.

The filter device may comprises: a filter capacitor portion 13 having a first set of ends correspondingly connected to the AC voltage unit 11 and a second set of ends connected with each other to form one neutral point N which is connected to one of the DC terminals O, P and Q of the semiconductor switching unit 12 via a low impedance element; a filter inductance portion 14 having four sets of connection terminals, wherein a first set of connection terminals are correspondingly connected to the AC voltage unit 11, a second set of connection terminals are correspondingly connected to the AC terminals A, B and C of the semiconductor switching unit, and a third set of connection terminal is connected to one of the two ends of the filter capacitor portion 13 or one of the DC terminals O, P and Q of the semiconductor switching unit 12; and a compensation portion 15 having one end connected to a fourth set of connection terminal of the filter inductance portion 14 and the other end connected to the ground. The compensation portion 15 may comprises a capacitive impedance element.

The low impedance elements may be defined as: within the concerned frequency range (for example, 9 kHz-1 MHz), it may has an impedance less than ½ time of the impedance of a primary winding of the filter inductance portion 14. For example, the low impedance elements may be a wire, a capacitor with less impedance or the like.

As for a power converter, it may have circuit nodes which are defined, according to the situation of the voltage change thereof relative to the ground, as static ground terminals or jumping terminals. The static ground terminal means a node with a voltage relative to the ground not jumping, or being at a jumping frequency far less than (for example at least one tenth of) the switching frequency of the semiconductor switching unit 12. The jumping terminal means a node with a voltage relative to the ground at a jumping frequency which is equal to or close to the switching frequency. Take FIG. 5 for example, since the low frequency AC voltage unit 11 has a frequency range of only 50-60 Hz, far less than the switching frequency of the semiconductor switching unit 12 (generally over 600 Hz), the three-phase terminals Ua, Ub and Uc of the low frequency AC voltage unit 11 may belong to the static ground terminals of the power converter. Since capacitors Cx of the filter capacitor portion 13 are directly connected to the three terminals Ua, Ub and Uc, they also belongs to the static ground terminal. Since the neutral point N of the filter capacitor portion 13 is connected to three terminals Ua, Ub and Uc only through low impedance elements (i.e. the capacitors Cx), which is also the static ground terminal. Moreover, since the neutral point N and the DC terminals O, P and Q of the semiconductor switching unit 12 are connected similarly only through low impedance elements, thus the DC terminals O, P and Q are also the static ground terminals. On the other hand, the AC terminals A, B and C of the semiconductor switching unit 12 directly connected to the switching elements which are switched at high frequencies may belong to jumping terminals of the power converter.

As above described, it is known that static ground terminals of the power converter may refer to all of the points connected to the low frequency AC voltage unit 11 through low impedance elements. The low impedance elements here may have a meaning such as defined as above, namely, within the concerned frequency range (for example, 9 kHz-1 MHz), the impedance thereof are less than ½ time of the impedance of a primary winding of the filter inductance 14. The low impedance elements for example may comprise a capacitor Cx.

The filter inductance portion 14 may comprise a plurality of filter inductances, wherein each filter inductance may comprise a primary winding and an auxiliary winding being coupled with the primary winding, the primary winding has two ends respectively acting as the first connection terminal and the second connection terminal of the filter inductance portion 14, and the auxiliary winding has an end which is a dotted terminal corresponding to the second connection terminal of the primary winding and acting as the third connection terminal of the filter inductance portion 14, and the other end which is a dotted terminal corresponding to the first connection terminal of the primary winding and acting as the fourth connection terminal of the filter inductance portion 14.

Specifically, each of the primary windings $L_A$, $L_B$ and $L_C$ has one end (acting as the first connection terminal of the filter inductance portion 14) correspondingly connected to the low frequency AC voltage unit 11, which may be defined as a static ground terminal of the primary winding, and the other end (acting as the second connection terminal of the filter inductance portion 14) correspondingly connected to the AC terminals A, B and C of the semiconductor switching unit 12, which may be defined as a jumping terminal of the primary winding. Each of the auxiliary windings $L_A'$, $L_B'$ and $L_C'$ may also have two ends, one is the dotted terminal of the jumping terminal of the primary winding and may be defined as a static ground terminal of the auxiliary winding, the other one is the dotted terminal of the static ground terminal of the primary winding and may be defined as a jumping terminal of the auxiliary winding. After the auxiliary windings being connected in series from head to end, the head one of the static ground terminals of the auxiliary windings (for example, the static ground terminal of $L_A'$ acting as the third connection terminal of the filter inductance portion 14) is connected to one of the static ground terminals of the power converter, and the end one of the jumping terminals of the auxiliary windings (for example, the jumping terminal of $L_C'$ acting as the fourth connection terminal of the filter inductance portion 14) is connected to the compensation portion 15.

With respect to the jumping terminals of the semiconductor switching unit 12, the auxiliary windings $L_A'$, $L_B'$ and $L_C'$ of the filter inductance portion 14 are correspondingly coupled with the primary windings $L_A$, $L_B$ and $L_C$ in the above manner, such that the auxiliary windings $L_A'$, $L_B'$ and $L_C'$ have a voltage jumping direction opposite to the voltage jumping direction of the jumping terminals of the power converter.

Within the concerned frequency range (for example, 9 kHz-1 MHz), the impedance of the compensation portion 15 is of capacitive property. The compensation portion 15 has one end connected to the end jumping terminal of the auxiliary windings of the filter inductance and the other end connected to the ground.

Figure 6:
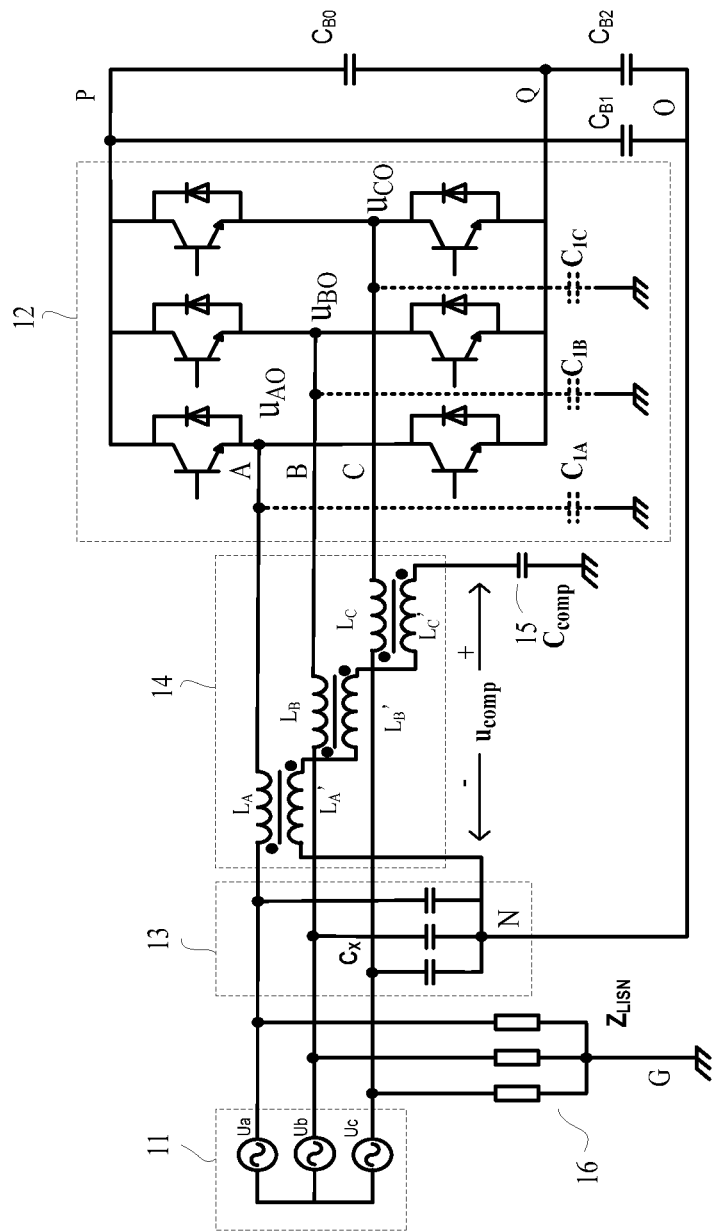
FIG. 6 is a circuit diagram illustrating a first example of the filter device according to the first embodiment of the present application.

FIG. 6 is a circuit diagram illustrating a first example of the filter device according to the first embodiment of the present application.

In an example as shown in FIG. 6, the AC voltage unit 11 has three-phase AC terminals Ua, Ub and Uc with three-phase AC voltages. The semiconductor switching unit 12 has three bridge arms formed by six groups of semiconductor switching elements, wherein each bridge arm is formed by two of the six groups of semiconductor switching elements, connected in series. The filter inductance portion 14 comprises three inductances respectively having primary windings $L_A$, $L_B$ and $L_C$ each has one end connected to a corresponding one of the three-phase AC terminals Ua, Ub and Uc of the AC voltage unit 11, and the other end connected to a corresponding one of the midpoints A, B and C of the three bridge arms of the semiconductor switching unit 12. The capacitors $C_{B1}$ and $C_{B2}$ are filter capacitors provided on the DC side of the semiconductor switching unit, having a common terminal O therebetween. The neutral point N of the filter capacitor portion 13 is connected to the DC common terminal O of the semiconductor switching unit 12 through a wire (i.e. a low impedance element). The capacitive impedance element of the compensation portion 15 may be a capacitor.

Figure 8:
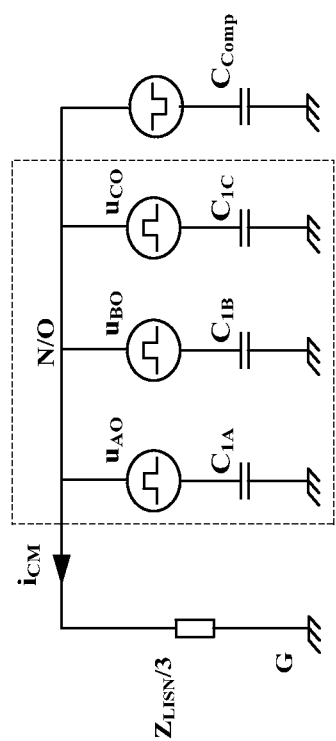
FIG. 8 is a diagram showing an equivalent model of common mode noise of the filter device according to the embodiment as shown in FIG. 6.
Figure 9:
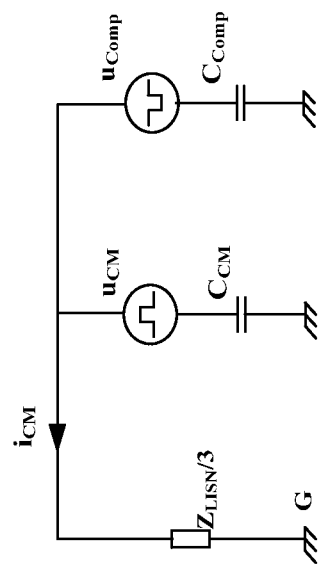
FIG. 9 is a diagram showing a further equivalent model of the equivalent model of common mode noise as shown in FIG. 8.
Figure 10:
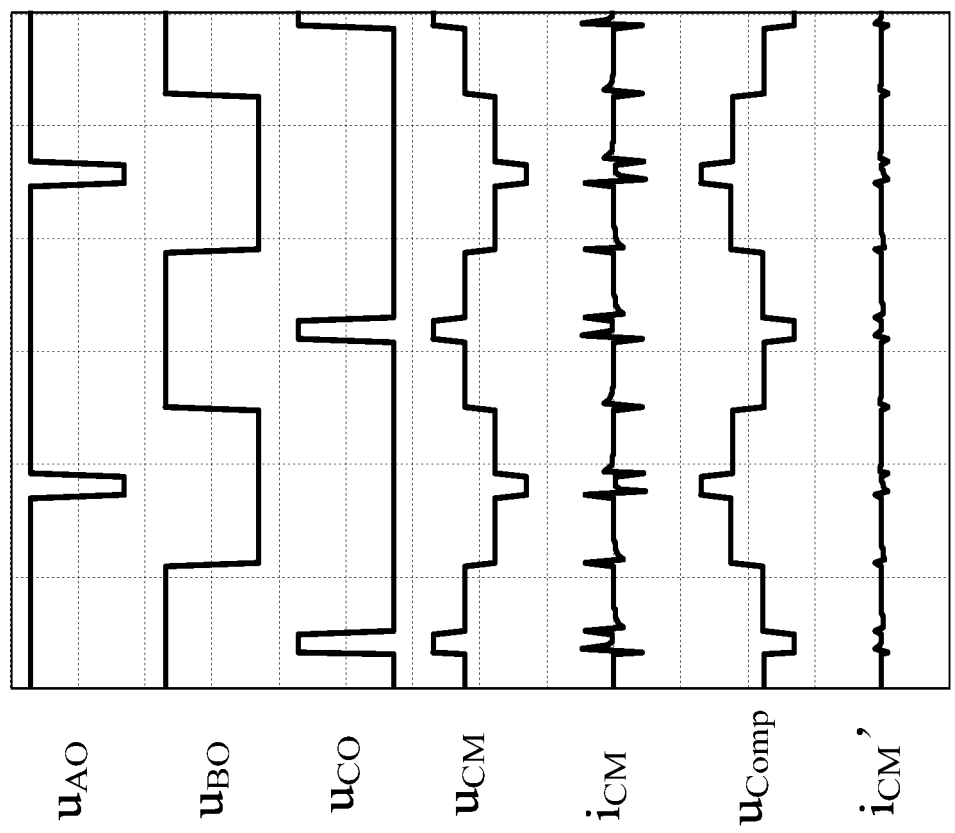
FIG. 10 is a waveform diagram showing correlated voltages and currents of the filter device according to the embodiment shown in FIG. 6.

FIG. 8 is a diagram showing an equivalent model of common mode noise of the filter device according to the embodiment shown in FIG. 6. FIG. 9 is a diagram showing a further equivalent model of the equivalent model of common mode noise as shown in FIG. 8. FIG. 10 is a waveform diagram showing correlated voltages and currents of the filter device according to the embodiment shown in FIG. 6.

The common mode noise filtering principle of the present application will be explained by referring to the noise models in FIGS. 8-9. Provided that $u_{AO}$, $u_{BO}$ and $u_{CO}$ are voltages respectively between the jumping terminals A, B and C and the static ground terminal O, and $C_{1A}$, $C_{1B}$ and $C_{1C}$ are distributed capacitors respectively between the jumping terminals A, B and C and the ground. The jumping voltages may generate displacement currents through these distributed capacitors. The displacement currents flow to the ground to produce common mode currents (these common mode currents may cause common mode noise). In the present application, each of the inductances in the filter inductance portion 14 is provided with one auxiliary winding to produce a compensation voltage Ucomp. The auxiliary windings $L_A'$, $L_B'$ and $L_C'$ have voltage jumping directions opposite to the voltage jumping directions of the jumping terminals A, B and C of the power converter, such that the compensation voltages have phases opposite to that of the jumping voltages $u_{AO}$, $u_{BO}$ and $u_{CO}$. Accordingly, the compensation voltages cause currents via the compensation capacitor of the compensation portion 15 in a direction opposite to the common mode current direction. In this way, the common mode currents flowing through the Line Impedance Stabilization Network (LISN) 16 may be counteracted to each other, such that the common mode noise can be suppressed.

Using the circuit principle of Thevenin's theorem, FIG. 8 may be further equivalent to the model shown in FIG. 9, wherein provided that the sum jumping voltage (or may be referred to as common mode voltage) of the jumping terminals A, B and C is $u_{CM}$, and the sum jumping capacitor (or may be referred to as common mode capacitor) of the jumping terminals A, B and C is $C_{CM}$, they should satisfy the following equations:

$$u_{CM} = \frac{u_{AO} \cdot C_{1A}}{C_{1A} + C_{1B} + C_{1C}} + \frac{u_{BO} \cdot C_{1B}}{C_{1A} + C_{1B} + C_{1C}} + \frac{u_{CO} \cdot C_{1C}}{C_{1A} + C_{1B} + C_{1C}} \quad \text{Equation 1}$$

$$C_{CM} = C_{1A} + C_{1B} + C_{1C} \quad \text{Equation 2}$$

Therefore, if the compensation voltage and the compensation capacitor satisfy:

$$u_{CM} \cdot C_{CM} = u_{Comp} \cdot C_{Comp} \quad \text{Equation 3}$$

The common mode current may be well compensated.

Namely, in order to achieve a good common mode noise filtering effect, the auxiliary winding of the filter inductance portion shall have a compensation voltage Ucomp in a phase opposite to that of the jumping voltage of the AC terminals of the semiconductor switching unit, and the product of the compensation voltage Ucomp of the auxiliary windings of the filter inductance portion and the compensation capacitor Ccomp of the compensation portion 15 may substantially equals to the product of the common mode voltage of the AC terminals of the semiconductor switching unit and the common mode capacitor.

In practices of engineering applications, certain compensation error may be allowed. An notable compensation effect (namely, the common mode noise filter effect) may be achieved if only $u_{Comp}*C_{Comp}$ is between 0.5 to 1.5 times of $u_{CM}*C_{CM}$.

In consideration of the symmetry of the three-phase circuit, a preferable situation may be: $C_{1A}=C_{1B}=C_{1C}=C_1$, then $$u_{CM}=(u_{AO}+u_{BO}+u_{CO})/3$$

$$C_{CM}=3C1$$

In this circumstance, the turns of the respective auxiliary windings $L_A'$, $L_B'$ and $L_C'$ may be selected respectively as ⅓ time of that of the primary windings $L_A$, $L_B$ and $L_C$, then the compensation capacitor $C_{Comp}=3C_1$; namely, the compensation voltage $u_{Comp}=(u_{AO}+u_{BO}+u_{CO})/3=u_{CM}$, and $C_{Comp}=3C_1=C_{CM}$.

FIG. 10 is a waveform diagram showing correlated voltages and currents of the filter device according to the embodiment shown in FIG. 6, wherein $i_{CM}$ is the common mode current waveform without the filter device of the present application, $i_{CM}'$ is the common mode current waveform when the filter device of the present application is provided. It can be seen from FIG. 10 that, the size of the compensation voltage $u_{Comp}$ equals to that of the common mode voltage $u_{CM}$ but only in a directions opposite to each other. After the filter device is provided, the common mode current $i_{CM}'$ is apparently suppressed.

Figure 7:
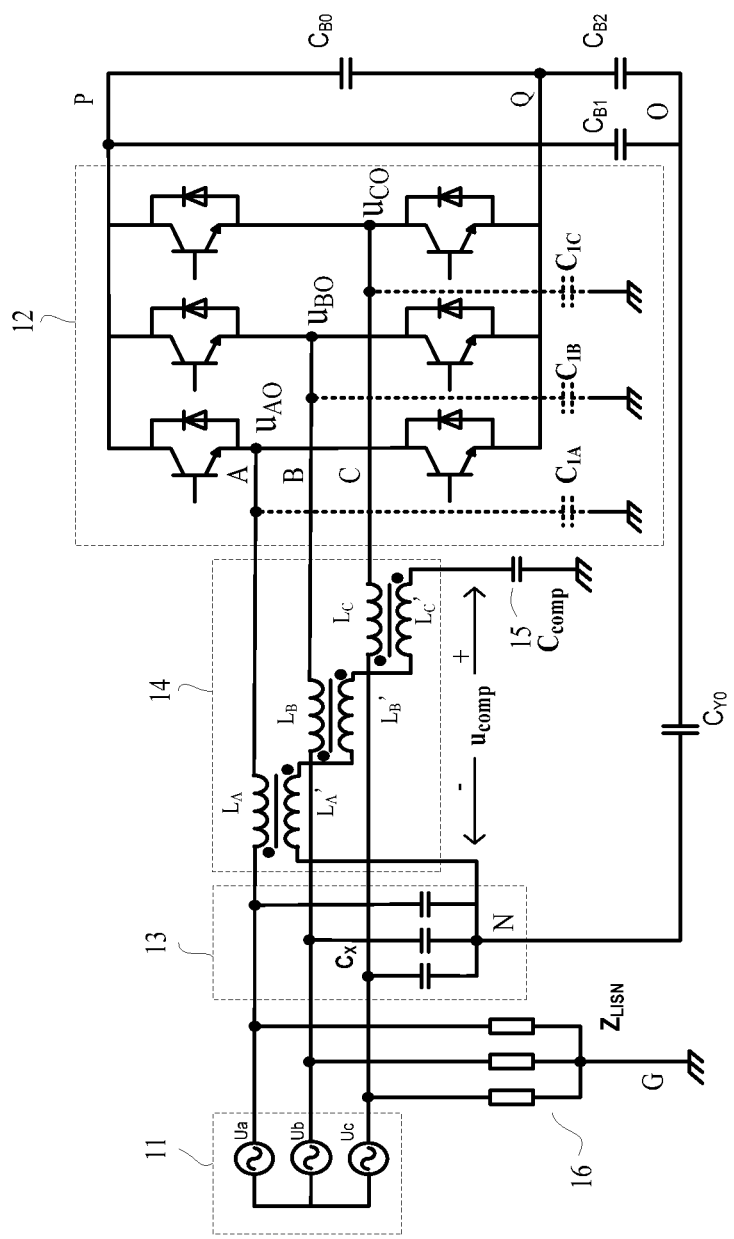
FIG. 7 is a circuit diagram illustrating a second example of the filter device according to the first embodiment of the present application.

FIG. 7 is a circuit diagram illustrating a second example of the filter device according to the first embodiment of the present application.

In the example as shown in FIG. 7, the low impedance element connected between the filter capacitor portion 13 and the DC terminal O of the semiconductor switching unit 12 is not a wire any more, but is replaced with a capacitor $Cy_O$ of low impedance element property. Other portions in the present example are similar to the example shown in FIG. 6.

With regard to the example of the filter device shown in FIG. 7, the noise model and the principle of filtering common mode noise are substantially the same as that of the example in FIG. 6.

Figure 11:
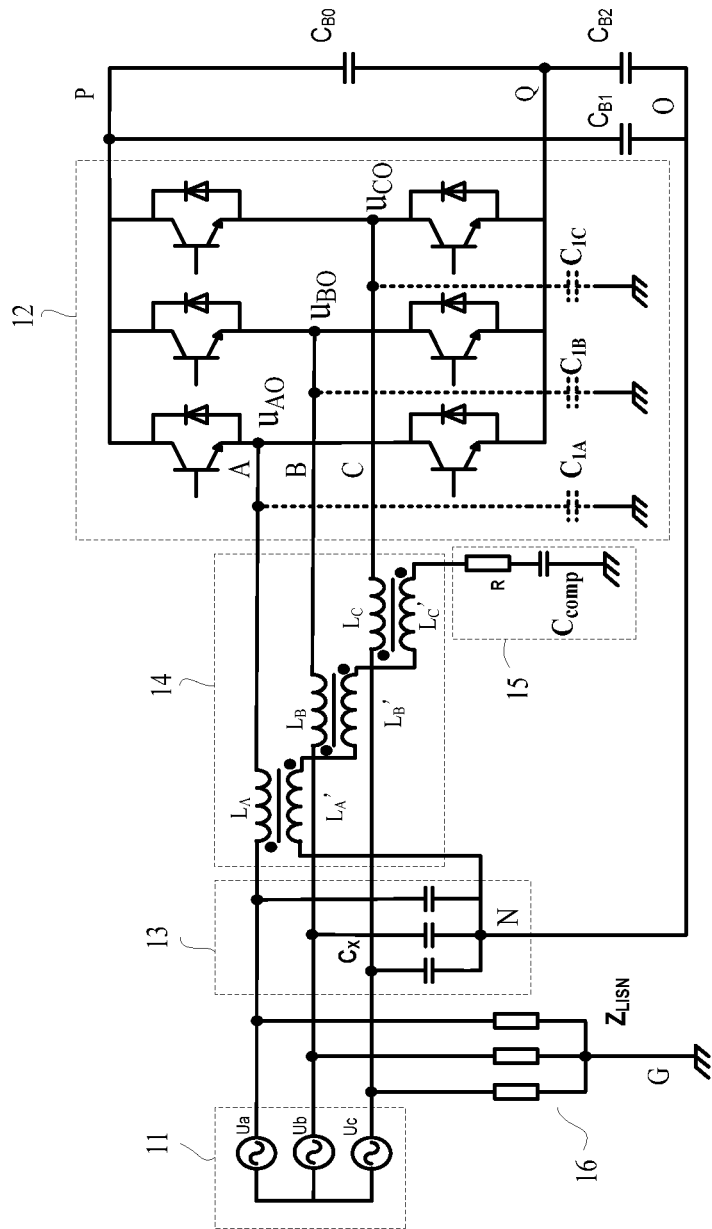
FIG. 11 is a circuit diagram illustrating a third example of the filter device according to the first embodiment of the present application.

Besides the two examples as the above shown in FIGS. 6-7, the filter device of the present application may be embodied in other ways. For example, in the example as shown in FIG. 11, the compensation portion may be a capacitor connected in series with a resistance. In consideration of actual applications, the primary windings and the auxiliary windings of the filter inductances may have leakage inductances therebetween, the leakage inductances may form resonance with the compensation capacitor of the compensation portion 15, which will affect the compensation effect. In this circumstance, the resonance may be damped by a resistance R connecting in series with the compensation capacitor.

Figure 12:
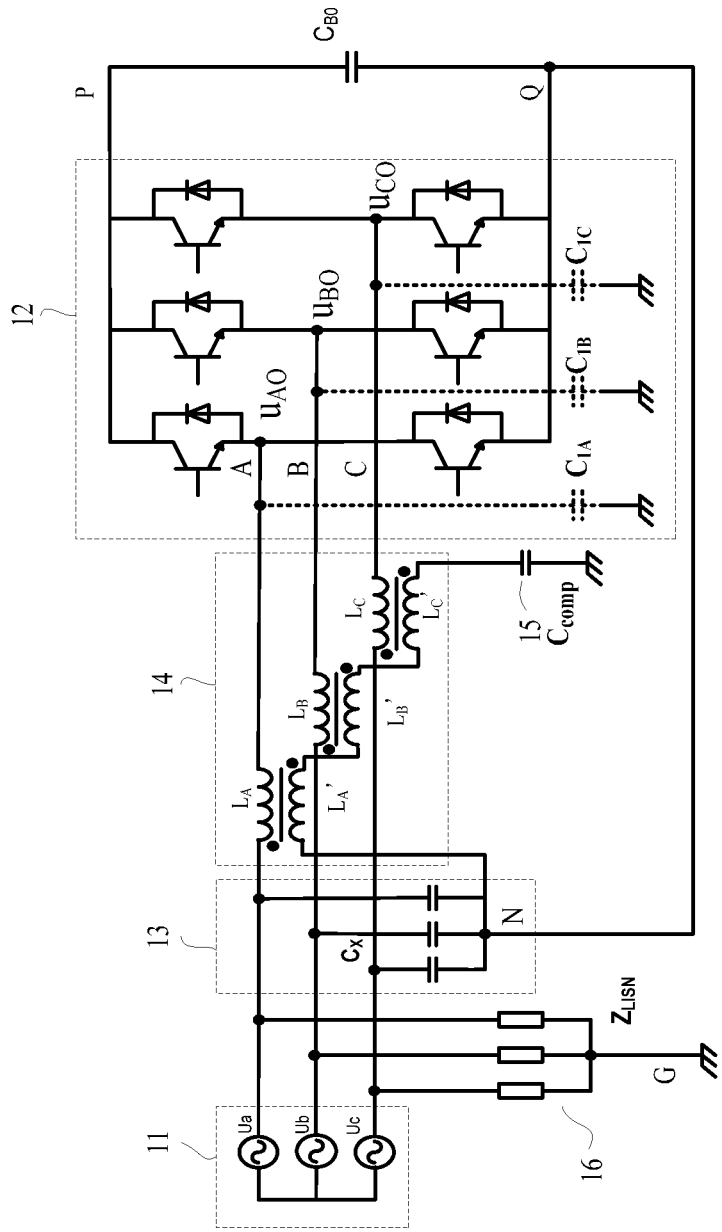
FIG. 12 is a circuit diagram illustrating a fourth example of the filter device according to the first embodiment of the present application.
Figure 13:
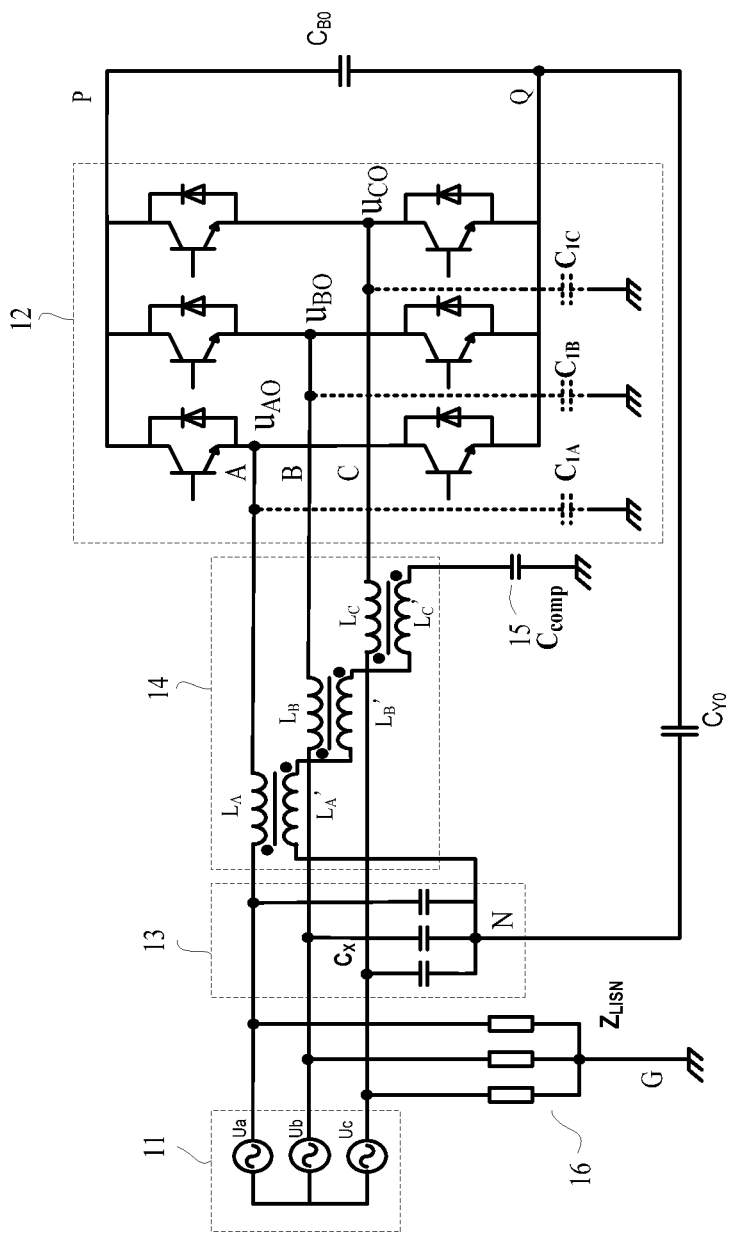
FIG. 13 is a circuit diagram illustrating a fifth example of the filter device according to the first embodiment of the present application.

In the examples shown in FIGS. 12-13, the neutral point N of the filter capacitor portion 13 is directly connected to one of the two-level DC terminals P and Q other than to the common terminal O of the filter capacitors $C_{B1}$ and $C_{B2}$. In this circumstance, the neutral point N of the filter capacitor portion 13 may also be connected to the DC terminals P or Q of the semiconductor switching unit via a wire, a capacitor $C_{YO}$ or the like.

Figure 14:
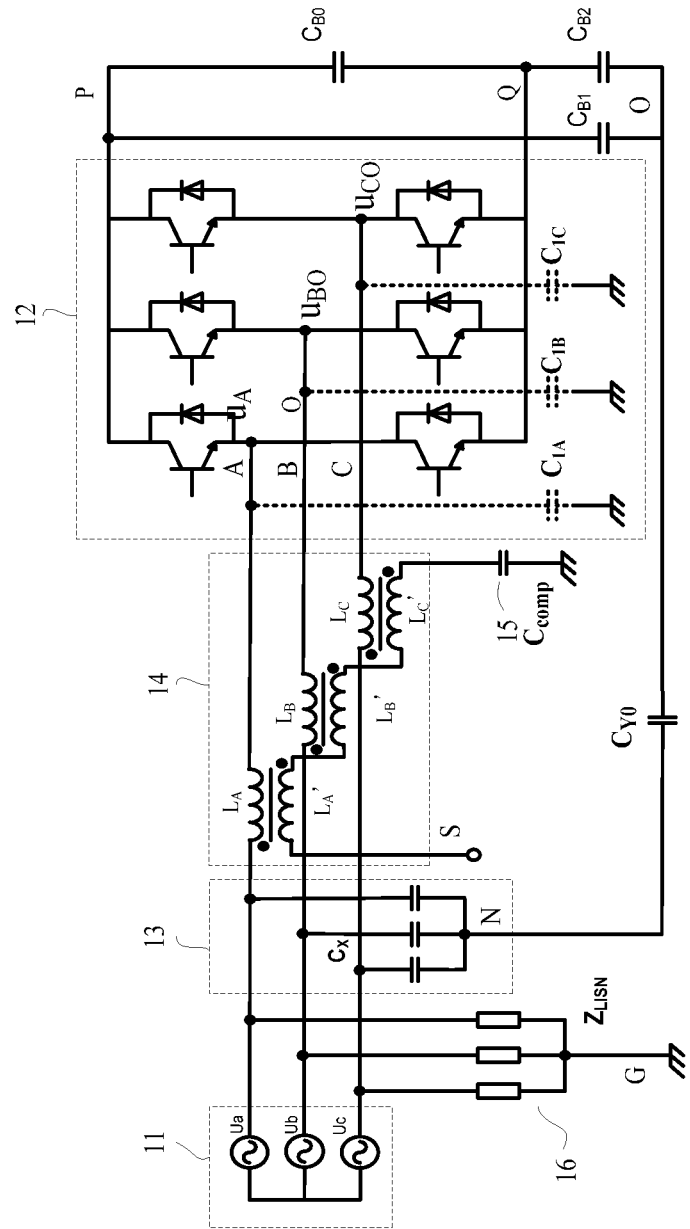
FIG. 14 is a circuit diagram illustrating a sixth example of the filter device according to the first embodiment of the present application.

Moreover, in the example as shown in FIG. 14, the third connection terminal (namely, the static ground terminal S of the auxiliary winding $L_A'$ of an inductance) in the filter inductance portion 14 may be connected to other static ground terminals of the power converter, for example, to one of the three-phase terminals (which is not the neutral point N of the filter capacitor portion 13) of the AC voltage unit 11 or to one of the three DC terminals O, P and Q of the semiconductor switching unit 12, other than to the neutral point N of the filter capacitor portion 13.

Figure 15A:
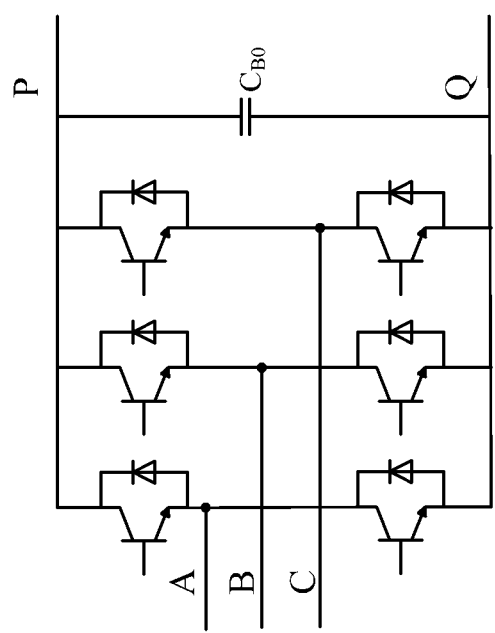
FIG. 15a is a diagram showing an example of the configuration of a two-level semiconductor switching unit in the present application.
Figure 15B:
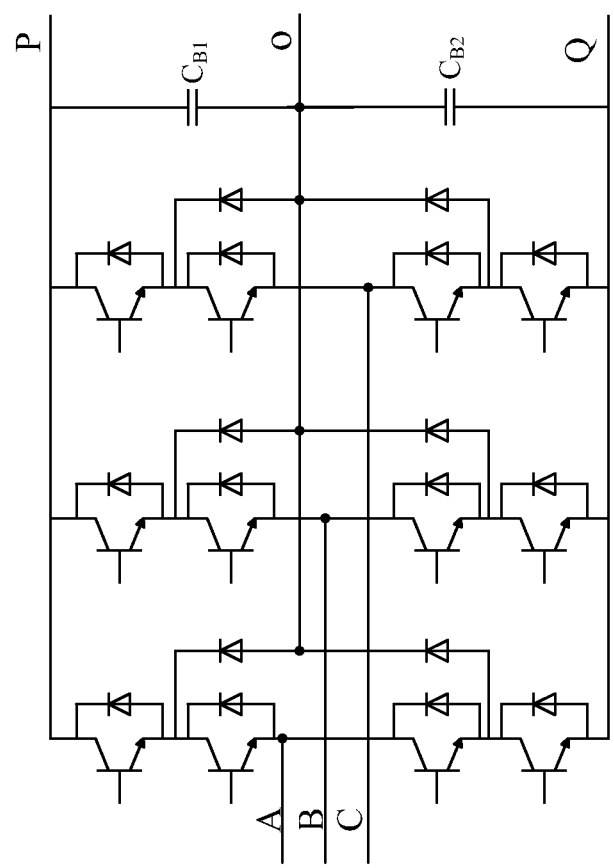
FIG. 15b is a diagram showing an example of the configuration of a three-level semiconductor switching unit in the present application.

Moreover, in addition to the two-level topology in FIGS. 12-13 (with a configuration such as shown in FIG. 15a), the semiconductor switching unit 12 of the present application may have multi-level topology, such as a three-level topological in an example shown in FIG. 15b.

Figure 16:
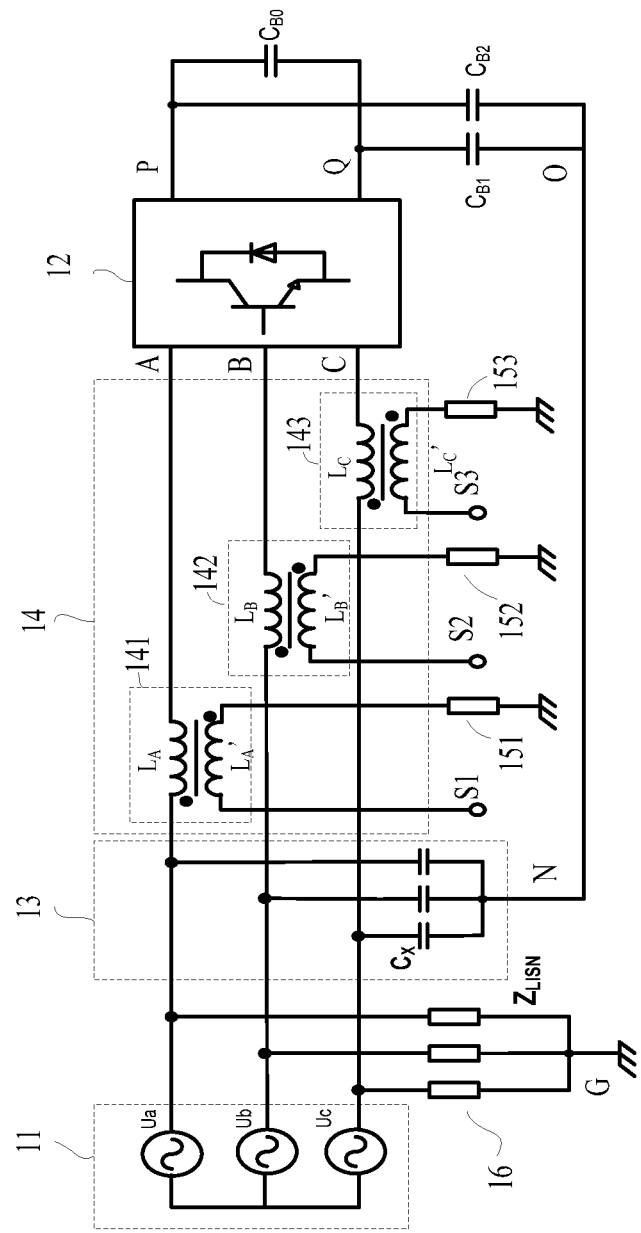
FIG. 16 is a circuit diagram illustrating a filter device according to the second embodiment of the present application.

FIG. 16 is a circuit diagram illustrating a filter device according to the second embodiment of the present application.

Referring to FIG. 16, a semiconductor switching unit 12 together with a filter device constitutes the power converter. The power converter receives an AC voltage from a low frequency AC voltage unit 11. The filter device of the present embodiment may also be provided between the low frequency AC voltage unit 11 and the semiconductor switching unit 12.

The low frequency AC voltage unit 11 has a frequency, for example, about 50 Hz or about 60 Hz. The semiconductor switching unit 12 may comprises one group of AC terminals A, B and C and one group of DC terminals O, P and Q. The voltage between the AC terminals have low frequency AC voltages being high-frequency modulated. The common modulating method may comprise Sinusoida Pulse Width Modulation SPWM, Space Vector Modulation or the like. The voltages between the DC terminals are DC voltages.

The filter device for filtering common mode noise in this circuit may comprise a filter capacitor portion 13, a filter inductance portion 14 and a compensation portion 15.

The filter capacitor portion 13 may comprise one group of filter capacitors (e.g. three filter capacitors) each having one end connected to a corresponding one of the three-phase AC terminals of the low frequency AC voltage unit 11 and the other end connected with other capacitors of the group to form the neutral point N.

The filter inductance portion 14 may comprise one group of filter inductances 141~143 (e.g. three filter inductances) each having one primary winding and one auxiliary winding. Each of the primary windings $L_A$, $L_B$ and $L_C$ has one end (the static ground terminal of the primary winding) connected to a corresponding one of the three-phase AC terminals of the low frequency AC voltage unit 11, and the other end (the jumping terminal of the primary winding) connected to the corresponding AC terminals A, B and C of the semiconductor switching unit 12. Each of the auxiliary windings $L_A'$, $L_B'$ and $L_C'$ may have one end being a dotted terminal of the jumping terminal of the primary winding and acting as one of the static ground terminals of the auxiliary windings S1, S2 and S3, and the other end being a dotted terminal of the primary winding static ground terminal and acting as one of the jumping terminals of the auxiliary windings. The static ground terminals S1, S2 and S3 of the auxiliary winding are connected to at least one of the static ground terminals of the power converter, and the jumping terminals of the auxiliary windings are connected to the compensation portion 15.

Similarly to the first embodiment shown in FIG. 5 to FIG. 15, the static ground terminals of the power converter may also comprise a three-phase AC terminals of a low frequency AC voltage unit 11, one set of ends of a filter capacitor portion 13 connected to the corresponding three-phase AC terminals, the neutral point N of the filter capacitor portion 13, and the DC terminals O, P and Q of a semiconductor switching unit 12 or the like.

On the other hand, the present embodiment differs from the first embodiment of the present application in that, in the present embodiment as shown in FIG. 16, the auxiliary windings $L_A'$, $L_B'$ and $L_C'$ are not just connected from head to end in series to form one third connection terminal of the filter inductance portion 14 and one fourth connection terminal of the filter inductance portion 14, but form respectively three third connection terminals (the static ground terminals) S1, S2 and S3 and three fourth connection terminals (the jumping terminals) instead, wherein these three third connection terminals S1, S2 and S3 may be connected to the same static ground terminal of the power converter (e.g., the neutral point N of the filter capacitor portion 13), or to different static ground terminals of the power converter respectively. For example, the third connection terminal S1 may be connected to the neutral point N, and the third connection terminals S2 and S3 may be connected to one or two of the DC terminals O, P and Q of the semiconductor switching unit 12.

The compensation portion 15 may comprise, for example, three capacitive impedances 151, 152 and 153. In this circumstance, three jumping terminals of the auxiliary windings $L_A'$, $L_B'$ and $L_C'$ each may be connected to a corresponding one end of the capacitive impedances 151, 152 and 153 of the compensation portion 15, and the other end of the capacitive impedance is connected to the ground.

The capacitive impedance of the compensation portion 15 is defined similarly as that of the first embodiment, namely, the impedance which within the concerned frequency range (for example, within 9 kHz-1 MHz) is of capacitive property.

A low impedance element is connected between the neutral point N of the filter capacitor portion 13 and the DC terminals O, P and Q of the semiconductor switching unit 12. The low impedance element is also defined similarly as that of the first embodiment in the present application, namely, within the concerned frequency range (for example, 9 kHz-1 MH), the impedance of the low impedance element is less than ½ time of the impedance of the primary windings of the filter inductance.

Figure 17:
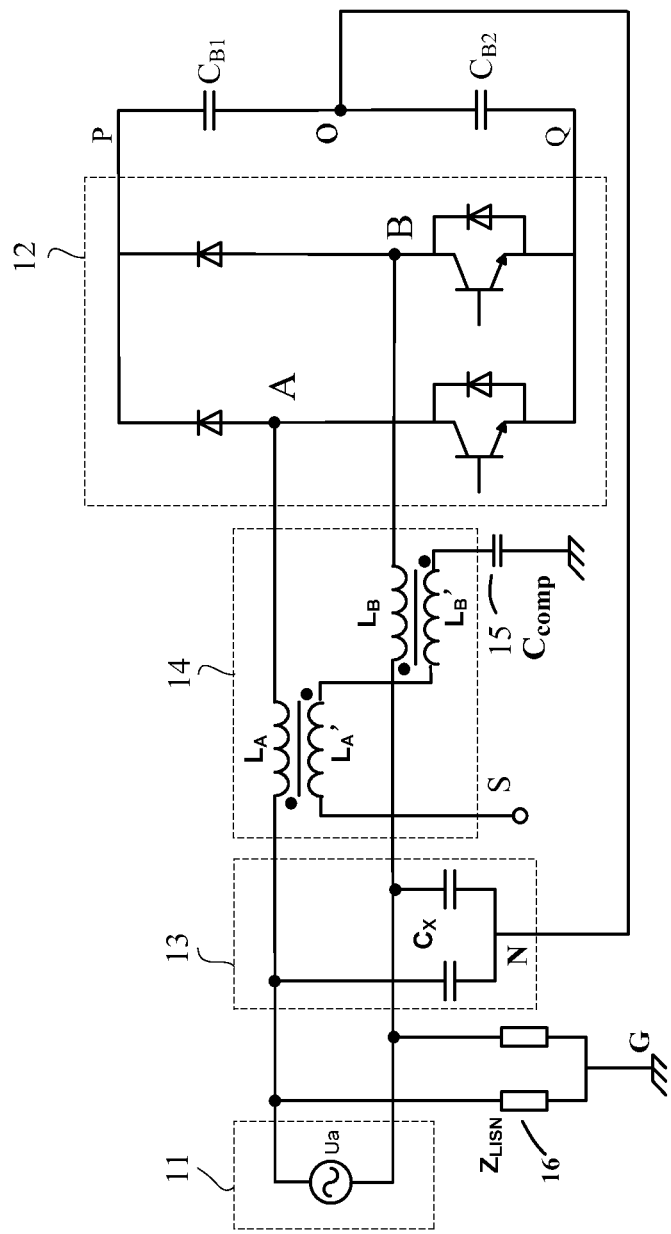
FIG. 17 is a circuit diagram illustrating a filter device according to the third embodiment of the present application.

FIG. 17 is a circuit diagram illustrating a filter device according to the third embodiment of the present application.

In the above first and second embodiments, the low frequency AC voltage unit 11 has three-phase AC voltages, and has three-phase AC terminals to be correspondingly connected to the filter capacitor portion 13 and the first connection terminals of the filter inductance portion 14, and the semiconductor switching unit 12 correspondingly comprises three AC terminals A, B and C. However, as shown in FIG. 17, the filter device of the present application may also be applied in a single-phase Power Factor Correction (PFC) circuit.

Specifically, in the third embodiment as shown in FIG. 17, the low frequency AC voltage unit 11 has a single-phase AC voltage and has two AC terminals. The semiconductor switching unit 12 may comprise two bridge arms formed by four groups of semiconductor switching elements, wherein each bridge arm is formed by two of the four groups of semiconductor switching elements, connected in series, thus the semiconductor switching unit 12 have two AC terminals A and B.

In the present embodiment, the filter capacitor portion 13 may comprise two capacitors Cx each has one end connected to a corresponding one of the two AC terminals of the low frequency AC voltage unit 11 and the other end connected with the other capacitor to form the neutral point N acting as one of the static ground terminals of the power converter.

The filter inductance portion 14 may comprise two inductances each having a primary winding and an auxiliary winding. The static ground terminals of the primary windings $L_A$ and $L_B$ may be connected to a corresponding one of the two AC terminals of the low frequency AC voltage unit 11. The jumping terminals of the primary windings $L_A$ and $L_B$ may be connected to the corresponding AC terminals A and B of the semiconductor switching unit 12. The auxiliary windings $L_A'$ and $L_B'$ each has two terminals, the head static ground terminal S of the auxiliary winding $L_A'$ (being a dotted terminal of the jumping terminal of the primary winding $L_A$, acting as the third connection terminal of the filter inductance portion 14) may be connected to one of the static ground terminals of the power converter, the static ground terminal of the auxiliary winding $L_B'$ may be connected in series with the jumping terminal of the auxiliary winding $L_A'$, and the end jumping terminal of the auxiliary winding $L_B'$ (being a dotted terminal of the static ground terminal of the primary winding $L_B$, acting as the fourth connection terminal of the filter inductance portion 14) may be connected to the compensation portion 15.

Similarly to the above other embodiments, the compensation portion 15 may also comprise a capacitive impedance which is for example a capacitor, or further comprise a resistance connected in series with the capacitor.

Similar to the above other embodiments, the static ground terminals of the power converter in the present embodiment may also comprise the two AC terminals of the low frequency AC voltage unit 11, one set of ends of the filter capacitor portion 13 connected to the two AC terminals, the neutral point N of the filter capacitor portion 13, and the DC terminals O, P and Q of the semiconductor switching unit 12 or the like.

In the present embodiment, the auxiliary windings $L_A'$ and $L_B'$ of the filter inductance portion 15 may also have similar way of connection as that in the example as shown in FIG. 16. For example, the two first ends of the auxiliary windings $L_A'$ and $L_B'$, each acting as the third connection terminal of the filter inductance portion, are correspondingly connected to one or two of the static ground terminals of the power converter, and the two second ends of the auxiliary windings $L_A'$ and $L_B'$ of the inductances, each acting as the fourth connection terminal of the filter inductance portion, are correspondingly connected to the compensation portion.

Thus it is known from the above description that in the present embodiment, the single-phase AC voltage unit 11, together with the semiconductor switching unit 12 and the filter device, constitutes a single-phase PFC circuit.

In the above embodiments of the present application, the power converter may be a rectifier unit for AC to DC, or an inverter unit for DC to AC, therefore the semiconductor switching unit 12 may be a semiconductor switching unit for AC-DC convertering, or a semiconductor switching unit for DC-AC convertering.

Now application examples of the power converter in the present application will be explained in detail in combination with FIGS. 18-20.

Figure 18:
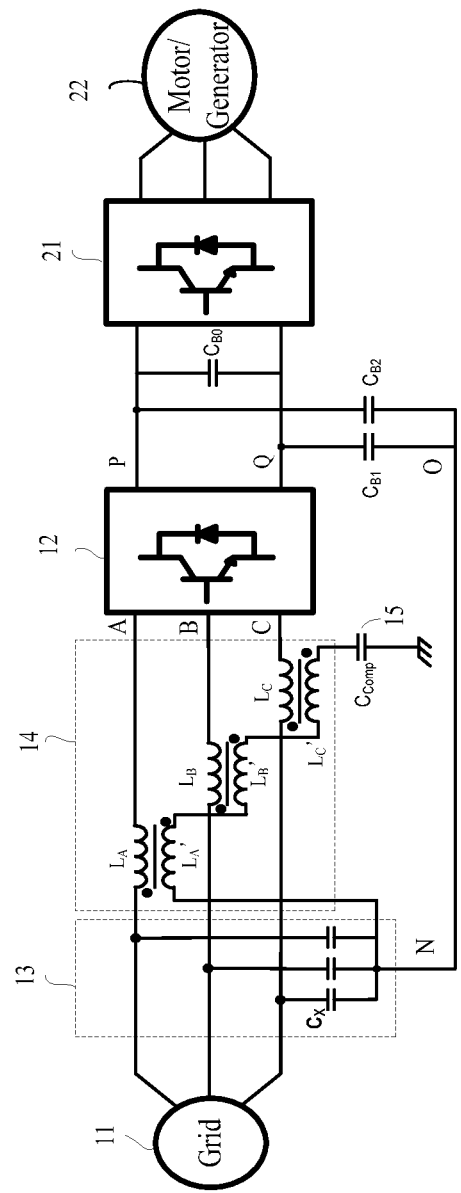
FIG. 18 is a diagram showing a first example of a power converter application system in the present application.

FIG. 18 is a diagram showing a first example of a power converter application system in the present application;

FIG. 18 shows a transducer drived motor (or electricity generation) system comprising a grid 11 and a motor (or electricity generator) 22. Here, the power converter may comprise a rectifier unit for AC to DC (or an inverter unit for DC to AC) 12 (namely, a first rectifier/inverter unit), and an inverter unit for DC to AC (or a rectifier for AC to DC) 21 (namely, a second rectifier/inverter unit).

The filter device may comprise a filter capacitor portion 13, a filter inductance portion 14 with auxiliary windings, and a compensation capacitor portion 15. Low impedance elements (the filter capacitors $C_{B1}$ and $C_{B2}$) are connected between the neutral point N of the filter capacitor portion 13 and the DC terminal O of the rectifier unit 12.

The filter device may be provided between the grid 11 and the rectifier unit 12 to filter the common mode noise on the input end of the rectifier unit 12.

In this example, power may flow from the grid 11 to the motor 22, and in this circumstance the grid 11 may provide power supply to drive the motor 22. In another embodiment, power may flow from the electricity generator 22 to the grid 11, and in this circumstance the electricity generator 22 generates and supplies power for the grid 11.

Figure 19:
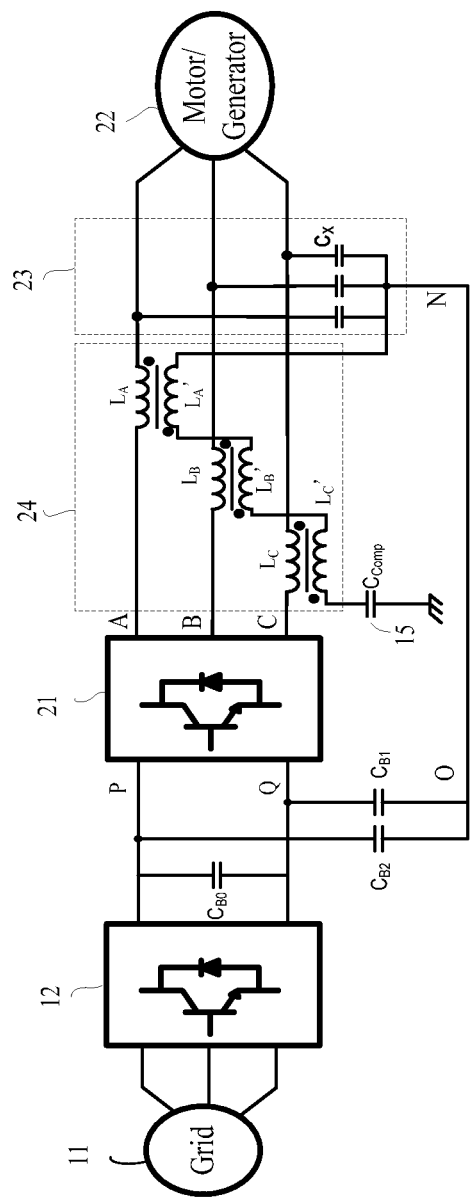
FIG. 19 is a diagram showing a second example of the power converter application system in the present application.

As shown in FIG. 19, in the present application, the filter device may be provided on the side of the motor (or electricity generator) 22, namely, between the inverter unit (or transducer) 21 and the motor 22 to suppress common mode noise on the output end of the inverter unit (or the transducer) 21. The filter device may comprise: an output filter capacitor portion 23 (corresponding to the filter capacitor portion 13 as in the above embodiments), an output filter inductance portion 24 with auxiliary windings (corresponding to the filter inductance portion 14 as in the above embodiments), and a compensation capacitor 15. Low impedance elements (the filter capacitors $C_{B1}$ and $C_{B2}$) are connected between the neutral point N of the output filter capacitor portion 23 and the DC terminals O of the inverter unit 21.

Moreover, in the present application, the power converter for filtering common mode noise in circuits may be applied to a Static Var Compensator (SVG), an active power filter (APF), a solar inverter, a wind power system or the like.

Figure 20:
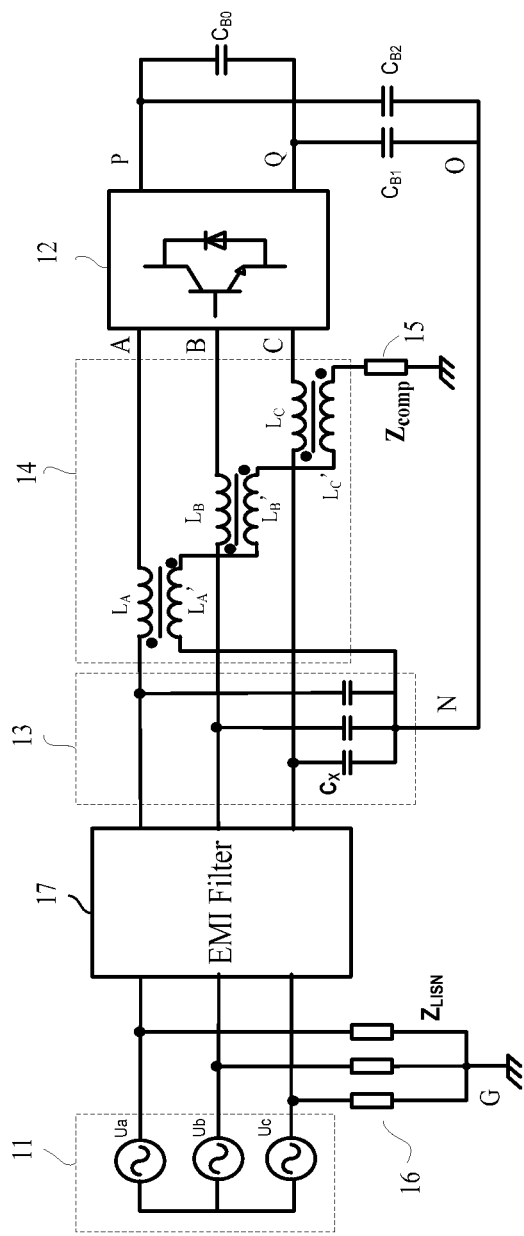
FIG. 20 is a diagram showing a third example of the power converter application system in the present application.

Moreover, the present application may cooperate with a conventional system using an electromagnetic interference filter (EMI Filter), as shown in FIG. 20. An EMI filter 17 may be provided between the grid 11 and the semiconductor switching unit 12 of the power converter, which may be a differential mode filter, a common mode filter, or a filter for both modes. The filter device in the present application may be provided between the EMI filter 17 and the semiconductor switching unit 12.

According to the above embodiments, the power converter or its application systems of the present application, as long as being provided with the filter device of the present application, may have the same noise model or the same principle for filtering common mode noise as that in the example as shown in FIG. 6.

According to another embodiment of the present application, it provides a common mode noise suppression method which may comprise: providing the filter capacitor portion, the filter inductance portion and the compensation portion according to the above embodiments into the power converter or other application systems, so as to filter common mode noise in these circuits.

The present application may have advantages as below over the prior art:

In the filter device of the present application, the filter capacitor portion may be exactly the filter capacitors in the typical structure of the conventional power converter, without additional capacitor elements, and the filter inductance portion may only add one auxiliary winding for each of the filter inductances respectively. Moreover, since the auxiliary winding of each filter inductance has only a compensation current, other than a power current, flowing thereon, the wires for respective auxiliary windings may be made very thin, and thus the auxiliary winding can be very cheap in cost.

Therefore, in comparison with the common mode inductance filter solutions in the prior art, the filter device of the present application has more compact structure, which is very cheap in cost, and is able to be easily implemented. With respect to the solution of only connecting the neutral point N of the filter capacitor with the midpoint O of the DC bus, the present application may filter the common mode noise very thoroughly, not only suppressing the common mode noise flowing to the ground via the distributed capacitor between the DC bus and the ground, but also suppressing the common mode currents caused by the capacitors $C_{1A}$, $C_{1B}$ and $C_{1C}$ between the midpoints of the bridge arms and the ground.

It is apparent that those skilled in the art may conceive any modifications and variations to the present application without departing from the spirit and the scope of the present application. In this way, the present application intends to cover the various modifications and variations to the present application, provided that they are within the scope of the claims and their equivalents of the present application.

What is claimed is:

1. A filter device connected between an AC voltage unit and a semiconductor switching unit of a power converter for filtering common mode noise in a circuit, comprising:
 a filter capacitor portion having one set of ends connected to the AC voltage unit, and the other set of ends connected to DC terminals of the semiconductor switching unit via a low impedance element, wherein both sets of ends of the filter capacitor portion and the DC terminals of the semiconductor switching unit are static ground terminals of the power converter;
 a filter inductance portion having a first set of connection terminals connected to the AC voltage unit, a second set of connection terminals connected to AC terminals of the semiconductor switching unit, a third set of connection terminals connected to one of the static ground terminals of the power converter, and a fourth set of connection terminals; and
 a compensation portion having one end connected to the fourth set of connection terminals and the other end connected to the ground.

2. The filter device according to claim 1, wherein the filter inductance portion comprises inductances each comprising:
 a primary winding whose ends correspondingly act as the first set of connection terminal and the second set of connection terminal; and
 an auxiliary winding coupled with the primary winding, having one end being a dotted terminal of the second set of connection terminal of the primary winding and acting as the third set of connection terminal of the filter inductance portion, and the other end as the fourth set of connection terminal of the filter inductance portion.

3. The filter device according to claim 2, wherein the low impedance element has an impedance value less than ½ time of that of the primary winding of the filter inductance portion.

4. The filter device according to claim 2, wherein a product of the compensation voltage of each of the auxiliary windings of the filter inductance portion and the equivalent impedance of the compensation portion equals to 0.5 to 1.5 times of a product of the equivalent common mode voltage and the equivalent common mode impedance of the semiconductor switching unit.

5. The filter device according to claim 1, wherein the semiconductor switching unit comprises at least one jumping terminal, the auxiliary winding of the filter inductance portion is coupled with the corresponding primary winding such that the auxiliary winding has a voltage in jumping direction opposite to that of the at least one jumping terminal of the power converter.

6. The filter device according to claim 1, wherein the DC terminals of the semiconductor switching unit are at least one of a high potential terminal, a low potential terminal or a neutral potential terminal.

7. The filter device according to claim 1, wherein the low impedance element is a wire or a capacitor.

8. The filter device according to claim 1, wherein the compensation portion comprises a capacitive impedance element.

9. The filter device according to claim 8, wherein the capacitive impedance element is a capacitor.

10. The filter device according to claim 8, wherein the compensation portion further comprises a resistance to be connected in series with the capacitive impedance element.

11. The filter device according to claim 1, wherein the AC voltage unit has three-phase AC voltages, and has three-phase AC terminals correspondingly connected to the first set of connection terminals of the filter inductance portion, and the AC terminals of the semiconductor switching unit consists of three AC terminals.

12. The filter device according to claim 11, wherein the filter capacitor portion consists of three capacitors each has one end connected to a corresponding one of the three-phase AC terminals, and the other end connected with the other two capacitors to form a neutral point acting as one of the static ground terminals of the power converter.

13. The filter device according to claim 11, wherein the filter inductance portion consists of a first inductance comprising a first primary winding and a first auxiliary winding, a second inductance comprising a second primary winding and a second auxiliary winding, and a third inductance comprising a third primary winding and a third auxiliary winding, each of the primary windings has a first end acting as the first set of connection terminal of the filter inductance portion and connected to a corresponding one of the three-phase AC terminals, and a second end acting as the second set of connection terminal of the filter inductance portion and connected to a corresponding one of the three AC terminals of the semiconductor switching unit, the first auxiliary winding has a first end acting as the third set of connection terminal of the filter inductance portion and connected to one of the static ground terminals of the power converter, the second auxiliary winding has a first end connected to a second end of the first auxiliary winding, the third auxiliary winding has a first end connected to a second end of the second auxiliary winding, and the third auxiliary winding has a second end acting as the fourth set of connection terminal of the filter inductance portion and connected to the compensation portion.

14. The filter device according to claim 11, wherein the filter inductance portion comprises three inductances each having a primary winding and an auxiliary winding, the primary winding has a first end acting as the first set of connection terminal of the filter inductance portion and connected to a corresponding one of the three-phase AC terminals, and a second end acting as the second set of connection terminal of the filter inductance portion and connected to a corresponding one of three AC terminals of the semiconductor switching unit, the auxiliary winding has a first end acting as the third set of connection terminal of the filter inductance portion and connected to a corresponding one of the static ground terminals of the power converter, and a second end acting as the fourth set of connection terminal of the filter inductance portion and connected to the compensation portion.

15. The filter device according to claim 1, wherein the AC voltage unit has a single-phase AC voltage, and has two AC terminals correspondingly connected to the first set of connection terminals of the filter inductance portion, and the AC terminals of the semiconductor switching unit consists of two AC terminals.

16. The filter device according to claim 15, wherein the filter capacitor portion consists of two capacitors each has one end connected to a corresponding one of the two AC terminals, and the other end connected with the other capacitor to form the neutral point acting as one of the static ground terminals of the power converter.

17. The filter device according to claim 15, wherein the filter inductance portion consists of a first inductance comprising a first primary winding and a first auxiliary winding, a second inductance comprising a second primary winding and a second auxiliary winding, each of the primary windings has a first end acting as the first set of connection terminal of the filter inductance portion and connected to a corresponding one of the two AC terminals, and a second end acting as the second set of connection terminal of the filter inductance portion and connected to a corresponding one of the two AC terminals of the semiconductor switching unit, the first auxiliary winding has a first end acting as the third set of connection terminal of the filter inductance portion and connected to one of the static ground terminals of the power converter, the second auxiliary winding has a first end connected to a second end of the first auxiliary winding, the second auxiliary winding has a second end acting as the fourth set of connection terminal of the filter inductance portion and connected to the compensation portion.

18. The filter device according to claim 15, wherein the filter inductance portion comprises two inductance each having a primary winding and an auxiliary winding, the primary winding has a first end acting as the first set of connection terminal of the filter inductance portion and connected to a corresponding one of the two AC terminals, and a second end acting as the second set of connection terminal of the filter inductance portion and connected to a corresponding one of the two AC terminals of the semiconductor switching unit, the auxiliary winding has a first end acting as the third set of connection terminal of the filter inductance portion and connected to a corresponding one of the static ground terminals of the power converter, and a second end acting as the fourth set of connection terminal of the filter inductance portion and connected to the compensation portion.

19. The filter device according to claim 1, wherein the semiconductor switching unit is an AC-DC semiconductor switching unit or a DC-AC semiconductor switching unit.

20. The filter device according to claim 1, wherein the semiconductor switching unit is a two-level semiconductor switching unit, a three-level semiconductor switching unit or a multi-level semiconductor switching unit.

21. A power converter comprising the filter device according to claim 1, the power converter further comprises the semiconductor switching unit, wherein the filter device is connected between the AC voltage unit and the semiconductor switching unit.

22. The power converter according to claim 21, wherein an electromagnetic interference filter is connected between the filter device and the AC voltage unit.

23. The power converter according to claim 22, wherein the electromagnetic interference filter is a differential mode filter or a common mode filter.

24. A common mode noise suppression method comprising: using the filter capacitor portion, the filter inductance portion and the compensation portion in the filter device according to claim 1 to filter the common mode noise in the circuit.

* * * * *